United States Patent [19]
Poll et al.

[11] Patent Number: 5,162,483
[45] Date of Patent: Nov. 10, 1992

[54] PREPARATION OF AN AROMATIC POLYAMIDE WITH CATALYST COMPRISING PHOSPHOROUS COMPOUND AND TIN(II) COMPOUND

[75] Inventors: Günter Poll, Marl; Martin Bartmann, Recklinghausen; Jürgen Finke, Marl, all of Fed. Rep. of Germany

[73] Assignee: Huels Aktiengesellschaft, Marl, Fed. Rep. of Germany

[21] Appl. No.: 602,544

[22] Filed: Oct. 24, 1990

[30] Foreign Application Priority Data

Oct. 25, 1989 [DE] Fed. Rep. of Germany ....... 3935466

[51] Int. Cl.⁵ .............................................. C08G 69/28
[52] U.S. Cl. .................................... 528/172; 524/606; 528/125; 528/126; 528/171; 528/173; 528/179; 528/180; 528/183; 528/185; 528/222; 528/223; 528/225; 528/229; 528/336; 528/337; 528/348

[58] Field of Search ............... 528/172, 336, 337, 348, 528/125, 126, 171, 173, 179, 183, 180, 185, 179, 222, 223, 225, 229; 524/606

[56] References Cited

U.S. PATENT DOCUMENTS

4,727,130  2/1988  Bartmann .......................... 528/336
4,749,768  6/1988  Finke et al. ........................ 528/336

*Primary Examiner*—Harold D. Anderson
*Attorney, Agent, or Firm*—Millen, White, Zelano and Branigan

[57] ABSTRACT

The invention provides aromatic polyamides having an improved resistance to thermo-oxidation. This is achieved by carrying out the polycondensation in the presence of a catalyst system which comprises a mixture of a phosphorus compound and a tin(II) compound or is a compound which contains both elements. The process according to the invention allows aromatic polyamides to be obtained which are resistant to thermo-oxidation (discoloration).

9 Claims, No Drawings

PREPARATION OF AN AROMATIC POLYAMIDE WITH CATALYST COMPRISING PHOSPHOROUS COMPOUND AND TIN(II) COMPOUND

CROSS-REFERENCE TO RELATED APPLICATION

This invention is related to the subject matter in co-pending, concurrently filed application Ser. No. 07/603,038 entitled "Molding Compositions Composed of a Thermoplastically Processable Aromatic Polyamide" by Poll et al., claiming priority to DE 39 35 468.7, filed Oct. 25, 1989, and copending, concurrently filed application Ser. No. 07/603,042, entitled "Process for the preparation of a Thermoplastically Processable Aromatic Polyamide" by Poll et al., claiming priority to DE 39 35 467.9, filed Oct. 25, 1989, both of which are assigned to the same assignee.

BACKGROUND OF THE INVENTION

The invention relates to a process for the preparation of an aromatic polyamide by polycondensation of the following monomers:

A. HOOC—Ar—COOH
B. $H_2N$—$Ar^1$—$NH_2$ in which the symbols have the following meanings:
Ar=1,3- or 1,4-phenylene; 1,4-, 1,5-, 2,6-, or 2,7-naphthylene,

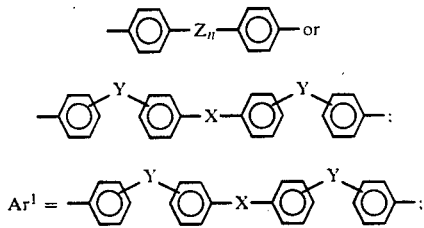

$X = -SO_2-, -CO-$;
$Y = -O-, -S-$;
$Z = -O-, -S-, -SO_2-, -CO-, -CR_2-$;
$R = -H, C_1-C_4$-alkyl; and
$n = 0, 1$ as a melt in the presence of a catalyst at temperatures in the range of from 200° to 400° C.

The preparation of polyamides of this type is known in principle and is disclosed, for example, in DE-A-3,609,011. However, the melt viscosity of these aromatic polyamides is high. Very high temperatures are, therefore, necessary for their preparation and processing, which are generally at least 350° C. At these temperatures, damage to the product is often observed, recognizable from discolorations or a deterioration in the mechanical properties.

SUMMARY OF THE INVENTION

An object of the invention is to provide molding compositions based on aromatic polyamides which have a lower melt viscosity.

Another object of the present invention is to provide aromatic polyamides which are more resistant to degradation caused by heat, i.e., thermo-oxidation, than the prior art products.

Further objects of the present invention are to provide a catalyst system and a method for producing such aromatic polyamides.

These and other objects will be apparent to one skilled in the art from the following disclosure.

The objects of this invention are achieved by carrying out the polycondensation reaction of the monomers in the presence of a phosphorus compound and a tin(II) compound as the catalyst, the content of phosphorus compound and tin(II) compound each being 0.05 to 4 mol %, relative to the sum of the components A and B, and using at least 0.05 mol % of the phosphorus compound and at least 0.05 mol % of the tin(II) compound, relative in each case to the sum of the components A and B.

Suitable phosphorus compounds are primarily triphenyl phosphite and acids of the general formula $H_3PO_m$, in which m=2 to 4.

Suitable acids derived from phosphorus are hypophosphorous acid, phosphorous acid, and phosphoric acid.

Examples of the tin(II) compounds used are salts of organic mono- and/or dicarboxylic acids having 2 to 16 carbon atoms in the carbon skeleton. These include tin(II) dioctanoate, tin(II) dilaurate, tin(II) dodecanedioate, tin(II) acetate, tin(II) oxalate, and the like.

Tin alcoholates are another group according to the invention of tin(II) compounds.

Examples of representatives of this group of compounds are tin(II) glycolate, tin(II) dimethanolate or tin(II) diethanolate.

Instead of physical mixtures, it is also possible to use compounds which contain not only phosphorus but also tin(II). Examples of representatives of this category are tin(II) salts of the acids derived from phosphorus and having the general formula $H_3PO_m$ in which m=2 to 4.

Also suitable are compounds of the general formula

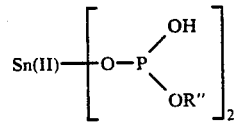

in which R" is methyl, ethyl, butyl, or 2-ethylhexyl.

Preference is given to compounds of this type in which R" is a methyl or 2-ethylhexyl radical.

The catalyst mixture composed of the phosphorus compound and the tin(II) compound is present in the reaction mixture in an amount of 0.05 to 4 mol %, preferably 0.2 to 2 mol %, relative to the components A and B. The mole ratio between the phosphorus compound and the tin(II) compound may, in principle, be selected at will. However, it must be ensured that the reaction mixture contains at least 0.05 mol % of the phosphorus compound and at least 0.05 mol % of the tin(II) compound, relative in each case to the sum of the components A and B.

Suitable aromatic dicarboxylic acids (component A) are isophthalic acid; terephthalic acid; 1,4-, 1,5-, 2,6-, and 2,7-naphthalenedicarboxylic acid; 4,4'-diphenyl ether dicarboxylic acid or 4,4'-benzophenonedicarboxylic acid; 4,4'-diphenyl sulfone dicarboxylic acid; 2-phenoxyterephthalic acid; 4,4-biphenyldicarboxylic acid; or mixtures thereof.

Preference is given to the use of isophthalic acid alone, or a mixture of isophthalic acid with one of the other above-mentioned acids, as component A. In the latter case, up to 45 mol % of isophthalic acid are replaced.

Examples of suitable aromatic diamines (component B) are 4,4'-bis(4-aminophenoxy)diphenyl sulfone; 4,4'-bis(3-aminophenoxy)diphenyl sulfone; 4,4'-bis(4-aminophenoxy)benzophenone; 4,4'-bis(3-aminophenoxy)benzophenone; 4,4'-bis(p-aminophenylmercapto)benzophenone; 4,4'-bis(p-aminophenylmercapto)benzophenone; 4,4'-bis(p-aminophenylmercapto)diphenyl sulfone; or mixtures thereof.

Preference is given to the use of 4,4'-bis(4-aminophenoxy)diphenyl sulfone.

The mole ratio of components A and B varies in the region of approximately 1:1, preferably in the range of from 1.1:1 to 1.01:1 and in particular 1.08:1 to 1.02:1.

The glass transition temperature ($T_g$) of the polyamides according to the invention is in the range of from 190° to 270° C. and the viscosity numbers (J values) are approximately 30–100 cm$^3$/g, preferably 60–80 cm$^3$/g.

An improved hydrolysis resistance of the polyamides can be achieved by adding to the products according to the invention a further 0.01 to 10 mol %, relative to the sum of the components A and B, of a low molecular weight aliphatic, araliphatic, or aromatic carboxamide. In this addition, the aromatic radical may be substituted by halogen or by $C_1$- to $C_4$-alkyl radicals. The measure is described in DE-A-3,804,401.

The preparation of the aromatic polyamides is known in principle. This is described in DE-A-3,609,011 and elsewhere.

Preference is given to the use of a procedure for the preparation of the aromatic polyamides in which, besides the catalyst mixture, dialkylaminopyridines are added as co-catalyst.

Particularly suitable dialkylaminopyridines are those having 1 to 10 carbon atoms in the alkyl group. Preference is given to the use of 4-dimethylaminopyridine, 4-dibutylaminopyridine, and 4-piperidinylpyridine, each of which may optionally form, together with the amino nitrogen, a pyrrolidine or piperidine ring.

If a co-catalyst is employed, it is used in an amount of from 0.05 to 4 mol %, preferably 0.2 to 2 mol %, relative to the sum of the components A and B. Particular preference is given to the addition of the co-catalyst to the reaction mixture in an amount equivalent to the catalyst mixture.

The reaction is carried out in the melt at temperatures in the range of from 200° to 400° C., preferably from 230° to 360° C.

It is normal to operate at atmospheric pressure under an inert gas. However, it is also possible to operate at elevated pressure or reduced pressure.

The molecular weight can be increased by subjecting the aromatic polyamides to solid phase post-condensation in an inert gas atmosphere.

The polyamides can be processed in conventional machines to give molding compositions.

The molding compositions may additionally contain fillers, such as talc, or reinforcing agents, such as glass fibers, ARAMID® fibers, or carbon fibers, and also other customary additives such as, for example, pigments or stabilizers.

The molding compositions are processed by conventional methods such as injection molding, extrusion, and the like to give moldings, fibers, and films. Equally, it is possible to use these molding compositions as coating compositions starting from powder (for example, fluidized bed coating), from a liquid dispersion or from a solution.

Aromatic polyamides which have been prepared by the process according to the invention withstand unexpectedly high temperatures. It is possible to process the products even at temperatures in excess of 340° C. without a diminution in the molecular weights or brown discoloration occurring. Furthermore, molding compositions obtained according to the invention have excellent resistance to thermo-oxidation so that they can be used at significantly higher temperatures than the corresponding prior art compositions. These properties include good heat resistance, i.e., molding compositions which are based on the aromatic polyamides according to the invention can be exposed for long periods to high temperatures without a significant loss in mechanical properties.

The quantities mentioned in the description and in the examples were determined with the help of the following methods:

The glass transition temperature ($T_g$) was determined using DSC at a heating rate of 10K/min.

The viscosity numbers (J) were determined from 0.5% by weight strength solutions of the polyamides in a phenol/o-dichlorobenzene mixture (1:1 by weight) at 25° C. in accordance with DIN 53 728.

The heat aging of the test pieces was carried out at 200° C. in a circulating air oven with a fresh air supply of 10%.

Examples designated by letters are not according to the invention.

Without further elaboration, it is believed that one skilled in the art, using the preceding description, can utilize the present invention to its fullest extent. The following preferred specific embodiments are, therefore, to be construed as merely illustrative and not limitative of the remainder of the disclosure in any way whatsoever.

In the foregoing and in the following examples, all temperatures are set forth in degrees Celsius; and, unless otherwise indicated, all parts and percentages are by weight.

The entire disclosures of all applications, patents and publications, cited above and below, and of corresponding West German Application P 39 35 466.0, filed Oct. 25, 1989, are hereby incorporated by reference.

EXAMPLES

Example 1

21.62 g (0.05 mol) of 4,4'-bis(4-aminophenoxy)diphenylsulfone, 8.31 g (0.05 mol) of isophthalic acid and 0.79 g (0.004 mol) of benzanilide were melted with 310 mg (0.001 mol) of triphenyl phosphite and 207 mg (0.001 mol) of tin oxalate in a polycondensation reactor fitted with stirrer, nitrogen feed, and distillation side arm at 250° C. After 20 minutes, the temperature was increased to 300° C. At the same time, the viscosity of the melt steadily increased, while the water liberated in the course of the reaction was distilled off. After 30 minutes at 300° C., the reaction was terminated. The viscosity number (J) was 30 cm$^3$/g. Solid phase post-condensation at 250° C. and 0.5 mbar gave, after 24 h, a polyamide having J = 61 cm$^3$/g.

Example A 21.62 g (0.05 mol) of 4,4'-bis(4-aminophenoxy)-diphenylsulfone and 8.31 g (0.05 mol) of isophthalic acid were reacted with 109 μl (0.001 mol) of 50% strength aqueous hypophosphorus acid and 122 mg (0.001 mol)

of 4-dimethylaminopyridine similar to Example 1. The viscosity number (J) of the polyamide was 35 cm³/g. The solid phase post-condensation similar to that of Example 1 gave a polyamide having J=75 cm³/g.

Examples 2-8

Examples 2-8 were carried out similar to Example 1, but the catalysts were varied in accordance with the table below.

Heat Aging

The polyamides prepared in Examples 1-8 and A were press-molded at a temperature of 310° C. and a pressure of 100 bar to give sheets 1 mm in thickness, and aged in a circulating air oven for 24 h. The polyamide prepared according to DE-A-3,609,011 in the comparative example had become dark brown in color, while the polyamides prepared according Examples 1-8 showed virtually no change.

X is —SO$_2$—, —CO—;
Y is —O—, —SO—;
Z is —O—, —S—, —SO$_2$—, —CO—, —CR$_2$—;
R is —H, C$_1$-C$_4$-alkyl; and
n=0, 1 as a monomer melt at temperatures in the range of from 200° C. to 400° C., in the presence of a catalyst comprising phosphorous compound and a tin(II) compound as the catalyst, the content of phosphorus compound and tin(II) compound each being 0.05 to 4 mol %, relative to the sum of the components A and B.

2. A process according to claim 1, wherein the content of the phosphorus compound and of the tin(II) compound is in each case 0.2 to 2 mol % relative to the sum of the components A and B.

3. A process according to claim 1, wherein the phosphorus compound is triphenyl phosphite.

4. A process according to claim 1, wherein the phos-

TABLE

| Example | Catalyst | | | Co-catalyst | | J [cm³/g] | J*) [cm³/g] |
|---|---|---|---|---|---|---|---|
| | | [mol %] | | | [mol %] | | |
| 1 | H$_3$PO$_2$ | 2.0 | Tin oxalate | — | 2.0 | 25 | 63 |
| 3 | H$_3$PO$_3$ | 4.0 | " | — | 4.0 | 21 | 61 |
| 4 | H$_3$PO$_2$ | 2.0 | " | DMAP**) | 4.0 / 2.0 | 23 | 60 |
| 5 | P(OPh)$_3$ | 4.0 | Tin(II) dilaurate | — | 3.0 | 21 | 64 |
| 6 | H$_3$PO$_2$ | 2.0 | Tin(II) dioctanoate | — | 4.0 | 22 | 68 |
| 7 | — | | Sn(II)HPO$_3$ | — | 4.0 | 24 | 68 |
| 8 | — | | 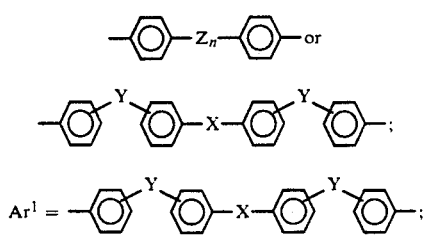 ***) | — | 3.0 | 31 | 64 |

*) measured after solid phase post-condensation
**) Dimethylaminopyridine
***) R" = 2-ethylhexyl The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A process for the preparation of an aromatic polyamide comprising polycondensing the following monomers:

Component A is HOOC—Ar—COOH
Component B is H$_2$N—Ar$^1$—NH$_2$
wherein:
Ar is 1,3- or 1,4-phenylene; 1,4-, 1,5-, 2,6-, or 2,7-napthylene,

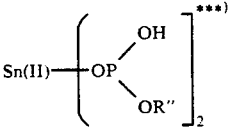

phorus compound is an acid of the general formula H$_3$PO$_m$ in which m=2 to 4.

5. A process according to claim 1, wherein the tin(II) compounds are salts of mono- and dicarboxylic acids having 2 to 16 carbon atoms in the carbon skeleton.

6. A process according to claim 1, wherein the phosphorus compound is selected from the group consisting of hypophosphorus acid, phosphorus acid, and phosphoric acid, and the tin(II) compound catalysts are selected from the group consisting of tin(II) dioctanoate, tin(II) dilaurate, tin(II) dodecanedioate, tin(II) oxalate, tin(II) glycolate, tin(II) acetate, tin(II) dimethanolate, and tin(II) diethanolate.

7. A process according to claim 1, wherein component A is selected from the group consisting of isophthalic acid; terephthalic acid; 1,4-, 1,5-, 2,6-, and 2,7-napthalene- dicarboxylic acid; 4,4'-diphenyl ether dicarboxylic acid and 4,4'-benzophenonedicarboxylic acid; 4,4'-diphenylsulfone dicarboxylic acid; 2-phenoxyterephthalic acid; 4,4'-diphenyl dicarboxylic acid; and mixtures thereof, and wherein component B is selected from the group consisting of 4,4'-bis(4-aminophenoxy)diphenylsulfone; 4,4'-bis(3-aminophenoxy) diphenylsulfone; 4,4'-bis(4-aminophenoxy)benzophenone; 4,4'-bis(3-aminophenoxy)benzophenone; 4,4'-bis(p-aminophenylmercapto) benzophenone; 4,4'-bis(p-aminophenylmercapto)diphenylsulfone; and mixtures thereof.

8. A process according to claim 1, wherein component A is isophthalic acid, and component B is 4,4'-bis(4-aminophenoxy)diphenylsulfone.

9. A process according to claim 1, wherein the monomer melt contains a solvent during polymerization.

* * * * *